US012787979B2

(12) United States Patent
Yang et al.

(10) Patent No.: US 12,787,979 B2
(45) Date of Patent: Nov. 10, 2026

(54) PET TRAINER

(71) Applicant: KIND PET PRODUCTS CO., LTD, Zhongshan (CN)

(72) Inventors: Tianle Yang, Zhongshan (CN); Yibao Zeng, Zhongshan (CN)

(73) Assignee: KIND PET PRODUCTS CO., LTD, Zhongshan (CN)

( * ) Notice: Subject to any disclaimer, the term of this patent is extended or adjusted under 35 U.S.C. 154(b) by 175 days.

(21) Appl. No.: 18/657,363

(22) Filed: May 7, 2024

(65) Prior Publication Data

US 2025/0151698 A1 May 15, 2025

(30) Foreign Application Priority Data

Nov. 15, 2023 (CN) ......................... 202323088690.4

(51) Int. Cl.
*A01K 15/02* (2006.01)
*G10K 15/04* (2006.01)

(52) U.S. Cl.
CPC ............ *A01K 15/021* (2013.01); *G10K 15/04* (2013.01)

(58) Field of Classification Search
CPC .................................................... A01K 15/021
See application file for complete search history.

(56) References Cited

U.S. PATENT DOCUMENTS 3,902,272 A * 9/1975 Molenaar ................. A63H 5/00 446/415
4,785,433 A * 11/1988 Bush .................... A01K 15/021 968/973
5,351,653 A * 10/1994 Marischen ........... A01K 15/021 119/905
8,737,169 B1 * 5/2014 DeWitt ................. A01M 29/18 367/139
10,058,089 B1 * 8/2018 Stephens ................ G10K 9/122
11,445,704 B1 * 9/2022 Trottier ................ A01K 15/021
2008/0072842 A1 * 3/2008 King ...................... A01K 15/02 119/719

(Continued)

FOREIGN PATENT DOCUMENTS

CN 216722648 U 6/2022
EP 1430773 A1 * 6/2004 ............... G10K 3/00

(Continued)

*Primary Examiner* — Eugene L Kim
*Assistant Examiner* — Alyssa M Hylinski
(74) *Attorney, Agent, or Firm* — Westbridge IP LLC

(57) ABSTRACT

A pet trainer includes a shell, a sounding assembly, a display screen, a timing button, a counting switch and a circuit board. The sounding assembly, the display screen and the timing button are all embedded on the shell, the counting switch and the circuit board are both disposed in the shell, the display screen, the timing button and the counting switch are all electrically connected with the circuit board, the sounding assembly may trigger the counting switch while making sounds. A user may trigger the timing button and the sounding assembly according to requirements, the circuit board records sounding time and sounding times and displays the recorded result on the display screen for assisting the user in sending out sound feedbacks of different times and different sounding intervals, a pet may understand and distinguish information of different sound feedbacks, in order to realize more professional training items.

6 Claims, 4 Drawing Sheets

(56) References Cited

U.S. PATENT DOCUMENTS

| | | | | |
|---|---|---|---|---|
| 2012/0244969 A1* | 9/2012 | Binder | H02J 50/10 | |
| | | | 473/570 | |
| 2022/0369597 A1* | 11/2022 | Qiu | A01K 27/006 | |
| 2023/0172166 A1* | 6/2023 | Delgado | A01K 27/002 | |
| | | | 119/792 | |

FOREIGN PATENT DOCUMENTS

| | | | |
|---|---|---|---|
| GB | 2530992 A * | 4/2016 | A01K 15/02 |
| GB | 2575507 A * | 1/2020 | A01K 27/009 |

* cited by examiner

PET TRAINER

CROSS-REFERENCE TO RELATED APPLICATIONS

This application claims priority to Chinese Patent Application No. 202323088690.4, filed on Nov. 15, 2023, the content of which is incorporated herein by reference in its entirety.

TECHNICAL FIELD

The present disclosure herein relates to the technical field of pet supplies, and in particular to a pet trainer.

BACKGROUND

In a training process of a pet, feedback needs to be given to the pet when the pet performs a corresponding behavior. Because the intonation and speech speed of a person during speaking are difficult to keep consistent, the pet has difficulty in distinguishing whether a statement spoken by an owner is positive or negative, therefore, in actual training, the sound made by a clicker, a whistle and the like is often used for replacing the voice of the person, whereby the pet, particularly a young pet, may be trained more efficiently. Although the whistle may make sounds with different volume and tone levels by controlling the flow rate of blown air, a certain learning cost is needed for a user, and it is difficult to master. The "click" sounds made each time when the clicker is pressed down are basically consistent, meanwhile, different instructions may be formed by controlling the pace of the sounds made by the clicker, the operation is simple, whereby it is more popular with consumers.

However, for an existing clicker for pet training, time and sounding times of the clicker cannot be recorded, whereby it is inconvenient for the user to control sounding intervals and times to form different feedback instructions, and more professional training items are difficult to meet.

SUMMARY

In order to overcome the defects of the relevant art, an objective of the present disclosure is to provide a pet trainer, which may record time and sounding frequency, in order to give more complex commands to a pet and realize more professional item training.

In order to solve the above problems, the technical solution adopted by the present disclosure is as follows: a pet trainer includes a shell, a sounding assembly, a display screen, a timing button, a counting switch and a circuit board, the sounding assembly, the display screen and the timing button are all embedded on the shell, the counting switch and the circuit board are both disposed in the shell, the display screen, the timing button and the counting switch are all electrically connected with the circuit board, and the sounding assembly may trigger the counting switch while making sounds.

Compared with the relevant art, the present disclosure has the beneficial effects that the timing button is disposed on the shell of the trainer, the trainer starts to time after the timing button is pressed down, and stops timing after it is pressed down again, and recorded time may be transmitted through the circuit board and displayed on the display screen, whereby a user may see timing data. The sounding assembly may trigger the counting switch while making sound, and recorded times may be transmitted through the circuit board and displayed on the display screen, whereby the user may see timing data. Therefore, the user may trigger the timing button and the sounding assembly according to requirements, and the circuit board records sounding time and sounding times and displays the recorded result on the display screen for assisting the user in sending out sound feedbacks of different times and different sounding intervals, whereby the pet may understand and distinguish information of different sound feedbacks, in order to realize more professional training items.

For the above pet trainer, the sounding assembly includes a button and a physical clicker, the button extends out of the shell through a through hole in the shell, the physical clicker is disposed in the shell, and two ends of the physical clicker are respectively connected with the button and the shell.

For the above pet trainer, a triggering part is disposed at the bottom of the button, and the triggering part triggers the counting switch when the button is pressed down.

For the above pet trainer, the tail end of the triggering part is sleeved with a silica gel sleeve.

For the above pet trainer, the middle of the physical clicker has a concave sounding part, supporting parts are disposed in the shell, the supporting parts are disposed on two sides of the sounding part, and the supporting parts support the side, back to the button, of the physical clicker.

For the above pet trainer, a sounding hole is disposed in the upper surface of the shell, and the sounding hole is located above the sounding part.

For the above pet trainer, a soft belt is disposed on the lower side of the shell, and two ends of the soft belt are respectively connected with the lower surface of the shell to form a belt ring through which fingers may pass.

For the above pet trainer, the shell includes a first shell and a second shell which are connected with each other and disposed at an angle, and two ends of the soft belt are respectively connected with the first shell and the second shell.

For the above pet trainer, a storage battery is further disposed in the shell and electrically connected with the circuit board.

For the above pet trainer, a charging interface is further disposed on the shell and electrically connected with the circuit board.

The present disclosure will be further described in detail below with reference to the drawings and specific implementation modes.

DETAILED DESCRIPTION OF THE EMBODIMENTS

Figure 1:
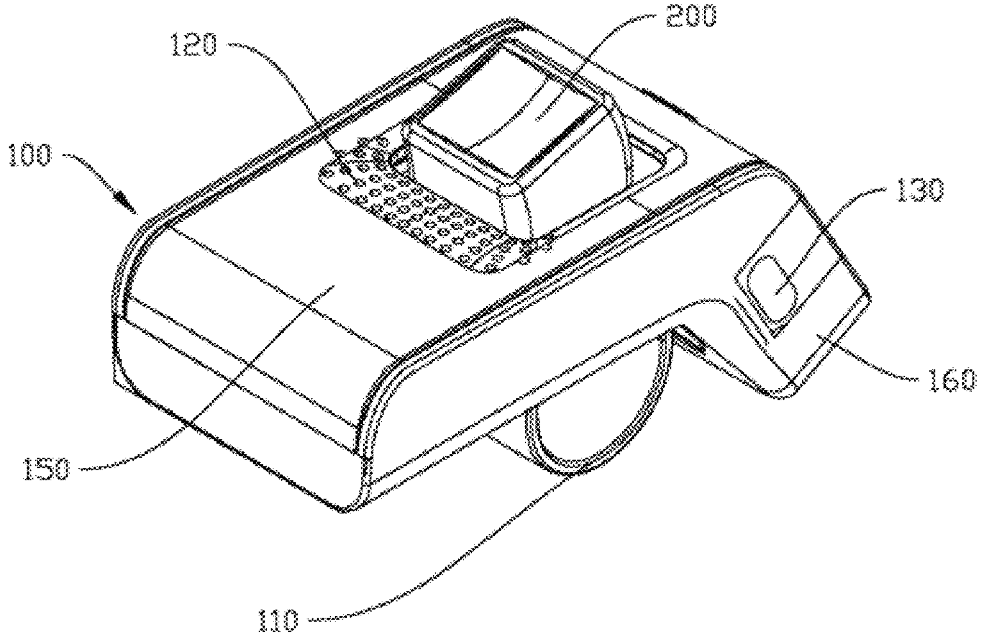
FIG. 1 is a schematic structure diagram of a three-dimensional view of an embodiment of the present disclosure.
Figure 2:
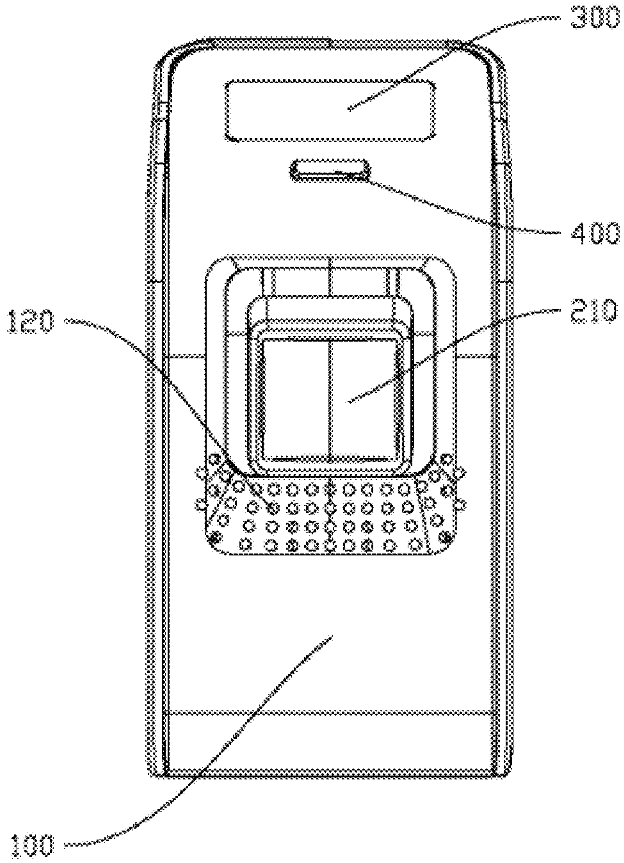
FIG. 2 is a schematic diagram of a top view of an embodiment of the present disclosure.

The embodiments of the present disclosure will be described in detail below.

Referring to FIGS. 1-4, the embodiment of the present disclosure provides a pet trainer, which includes a shell 100, a sounding assembly 200, a display screen 300, a timing button 400, a circuit board 500 and a counting switch 600, the sounding assembly 200, the display screen 300 and the timing button 400 are all embedded on the shell 100, and the circuit board 500 and the counting switch are disposed in the shell 100. The display screen 300, the timing button 400 and the counting switch 600 are all electrically connected with the circuit board 500, and the sounding assembly 200 may trigger the counting switch 600 while making sounds.

For the trainer, the timing button 400 is disposed on the shell 100, the trainer starts to time after the timing button 400 is pressed down, and stops timing after it is pressed down again, and recorded time may be transmitted through the circuit board 500 and displayed on the display screen 300, whereby a user may see timing data. The sounding assembly 200 may trigger the counting switch 600 while making sound, and recorded times may be transmitted through the circuit board 500 and displayed on the display screen 300, whereby the user may see timing data. Therefore, the user may trigger the timing button 400 and the sounding assembly 200 according to requirements, and the circuit board 500 records sounding time and sounding times and displays the recorded result on the display screen 300 for assisting the user in sending out sound feedbacks of different times and different sounding intervals, whereby the pet may understand and distinguish information of different sound feedbacks, in order to realize more professional training items.

It can be understood that in order to realize level counting on triggered times of the counting switch 600, recording on time and driving for the display screen, a controller, a timer, a counter, a display screen driver and a printed circuit for electrically connecting the above components should be integrated on the circuit board. The controller may be a single chip microcomputer or ARM, the timer may be a DS1302 clock chip, the counter may be a 74LS160 chip, etc., the display screen driver may be selected according to type of the selected display screen, and if an LED display is adopted, an HT16K33 or TM1637 driver chip and the like may be selected. The specific settings and connection relationships of each device on the circuit board are the common knowledge in the field, and are not the focus of protection in this disclosure, so it is not necessary to elaborate here.

Figure 3:
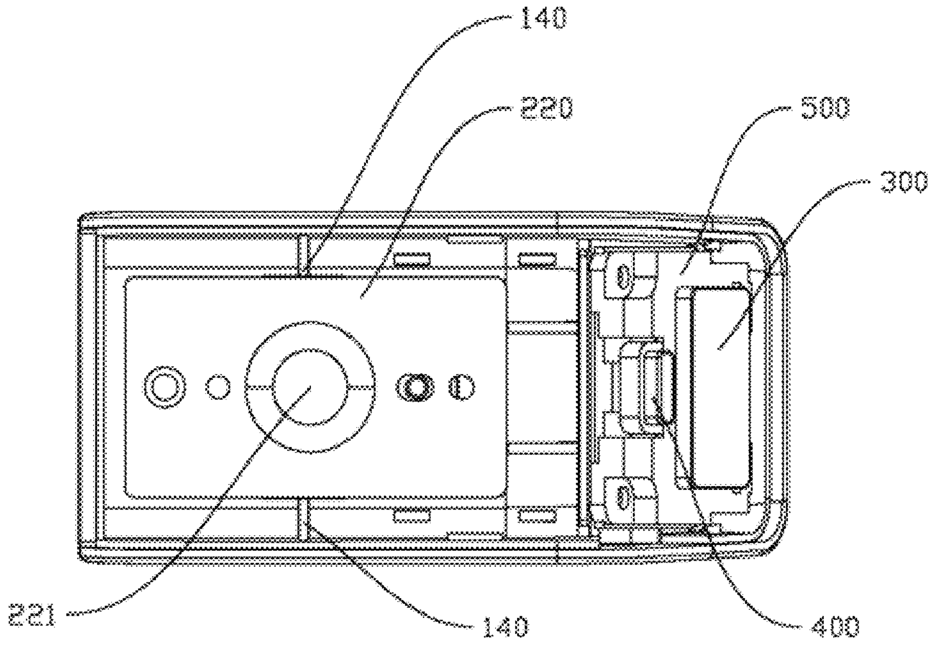
FIG. 3 is a schematic diagram of a top view of an internal structure of an embodiment of the present disclosure.
Figure 4:
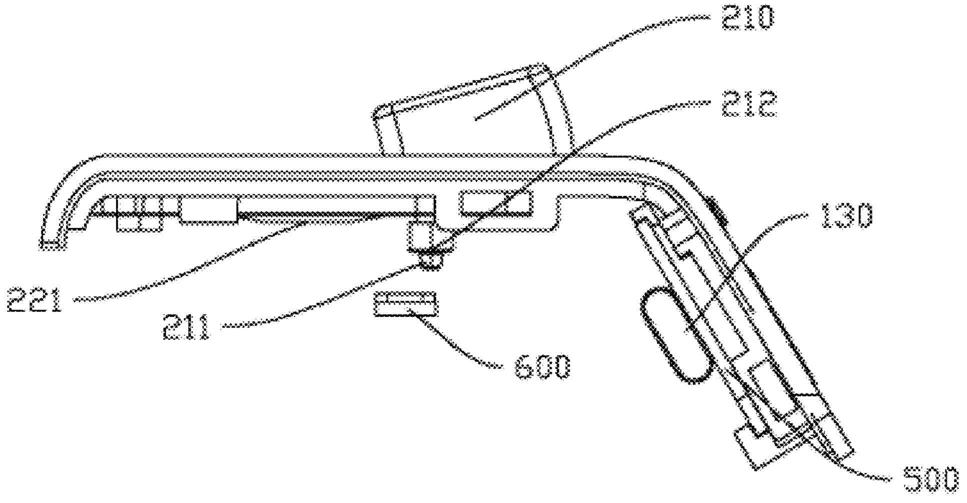
FIG. 4 is a schematic diagram of a side view of an internal structure of an embodiment of the present disclosure.

It can be understood that the sounding assembly 200 may be triggered to make sounds by a mechanical mode, such as an air horn or a clicker, and also may be triggered to make sounds by an electric control mode, such as a buzzer. Referring to FIGS. 3 and 4, in the embodiment, the sounding assembly 200 includes a button 210 and a physical clicker 220, the physical clicker 220 is a metal sheet or a rubber sheet with elasticity, two ends of the physical clicker 220 are respectively connected with the button 210 and the shell 100, and the upper surface of the button 210 extends out of the shell 100 through a through hole in the shell 100. The middle of the physical clicker 220 has a concave sounding part 212, and supporting parts 140 are disposed on the inner wall of the shell 100. The supporting parts 140 are disposed on two sides of the sounding part 212, and support the lower surface of the physical clicker 220. In use, the button 210 is pressed down, whereby the physical clicker 220 is downwards bent to deform, and since the sounding part 212 is supported by the supporting part 140, the supporting part 140 may be a fulcrum for bending of the physical clicker 220. When the physical clicker 220 is bent to a certain extent, the concave sounding part 212 may flip upwards under the action of the supporting part 140 and deformation, and thus air at the sounding part 212 is vibrated to make "click" sounds. Furthermore, a sounding hole 120 is disposed in the upper surface of the shell 100, the sounding hole 120 is disposed above the sounding part 212, and "click" sounds made by the sounding part 212 may be transmitted to outside through the sounding hole 120.

Referring to FIG. 4, in the embodiment, the counting switch 600 is a touch switch, and when the sounding assembly 200 makes sounds, the button 210 contacts the touch switch and triggers the touch switch. A triggering part 211 is disposed at the bottom of the button 210, in the embodiment, the triggering part 211 is of a cylindrical structure, which extends below the physical clicker 220 by passing through the through hole in the physical clicker 220, and a silica gel sleeve 212 is disposed at the bottom of the triggering part 211 for protecting the timing switch 600 to prevent the timing switch 600 from being damaged by pressing pressure.

Referring to FIGS. 1 and 4, in order to facilitate carrying, in the embodiment, the circuit board 500 and the display screen 300 are powered by a storage battery (not shown in the figure), the storage battery is electrically connected with the circuit board 500, a charging interface 130 is disposed on one side of the shell 100, and the charging interface 130 is electrically connected with the circuit board 500 and may be connected with an external power supply to charge the storage battery. In the embodiment, the charging interface 130 is a Type-c interface. Meanwhile, a soft belt 110 is further disposed on the lower side of the shell 100, and two ends of the soft belt 110 are respectively connected with the lower surface of the shell 100 to form a belt ring through which fingers may pass, whereby the trainer may be worn on hand like a ring, convenient for use. Furthermore, referring to FIG. 1, the shell 100 includes a first shell 150 and a second shell 160 which are connected with each other and disposed at an angle, and the first shell 150 and a second shell 160 are integrally formed, for facilitating taking and use of a user. Two ends of the soft belt 110 are respectively connected to the first shell 150 and the second shell 160, whereby the belt ring may be better formed.

It is to be noted that in the description of the present disclosure, if orientation description is related, for example, orientation or position relationships indicated by terms "upper", "lower", "front", "rear", "left", "right" and the like are orientation or position relationships shown in the drawings, are adopted not to indicate or imply that indicated apparatuses or components must be in specific orientations or structured and operated in specific orientations but only to conveniently and simply describe the present disclosure and thus should not be understood as limits to the present present disclosure.

In the descriptions of the present disclosure, "a plurality of" means one or more, "multiple" means two or more, greater than, less than, more than and the like are understood to exclude this number, and above, below, within and the like are understood to include this number. Terms "first" and "second" are only adopted for distinguishing technical features and should not be understood to indicate or imply relative importance or implicitly indicate the number of indicated technical features or implicitly indicate the sequence of the indicated technical features.

In the description of the present disclosure, unless otherwise limited definitely, the terms "dispose" "mount" and "connect" should be broadly understood, for those skilled in the art, specific meanings of these terms in the present disclosure can be reasonably determined according to a specific content of the technical solution.

The implementation modes described above are only preferred implementation modes of the present disclosure and are not intended to limit the scope of protection of the present disclosure, and any insubstantial changes and substitutions made by those skilled in the art on the basis of the disclosure shall fall within the scope of protection of the present disclosure.

What is claimed is:

1. A pet trainer, comprising a shell, a sounding assembly, a display screen, a timing button, a circuit board and a counting switch, wherein the sounding assembly comprises a button and a physical clicker, the button extends out of the shell through a through hole in the shell, the physical clicker is disposed in the shell, one end of the physical clicker is connected with the button, and the other end of the physical clicker is connected with the shell;

wherein a middle of the physical clicker has a concave sounding part, supporting parts are disposed in the shell, the supporting parts are disposed on two sides of the sounding part, and the supporting parts support the surface, opposite the button, of the physical clicker;

wherein the sounding assembly, the display screen and the timing button are all embedded on the shell, the counting switch and the circuit board are both disposed in the shell, the display screen, the timing button and the counting switch are all electrically connected with the circuit board;

wherein a triggering part is disposed at a bottom of the button, and when the button is pressed down, the physical clicker makes a sound and at the same time the triggering part moves down and triggers the counting switch, and wherein a tail end of the triggering part is sleeved with a silica gel sleeve.

2. The pet trainer according to claim 1, wherein a sounding hole is disposed in an upper surface of the shell, and the sounding hole is located above the sounding part.

3. The pet trainer according to claim 1, wherein a soft belt is disposed on a lower side of the shell, and two ends of the soft belt are respectively connected with a lower surface of the shell to form a belt ring through which fingers are arranged to pass.

4. The pet trainer according to claim 3, wherein the shell comprises a first shell and a second shell which are connected with each other and disposed at an angle, and two ends of the soft belt are respectively connected with the first shell and the second shell.

5. The pet trainer according to claim 1, wherein a storage battery is further disposed in the shell, and the storage battery is electrically connected with the circuit board.

6. The pet trainer according to claim 5, wherein a charging interface is further disposed on the shell, and the charging interface is electrically connected with the circuit board.

* * * * *